United States Patent [19]

Stashko

[11] Patent Number: 4,838,739

[45] Date of Patent: Jun. 13, 1989

[54] BALL NOSE END MILL AND METHOD OF MANUFACTURE

[75] Inventor: Daniel R. Stashko, Holly, Mich.

[73] Assignee: GTE Valenite Corporation, Troy, Mich.

[21] Appl. No.: 98,172

[22] Filed: Sep. 18, 1987

[51] Int. Cl.⁴ .............................................. B23C 5/02
[52] U.S. Cl. ...................................... 407/42; 407/54; 407/62; 407/40
[58] Field of Search .................... 407/40, 41, 42, 34, 407/35, 36, 53, 54, 16, 48, 109, 110, 62, 116; 408/223, 224, 227, 228, 229, 230, 713

[56] References Cited

U.S. PATENT DOCUMENTS

| | | | |
|---|---|---|---|
| 3,136,030 | 6/1964 | Jarret | 407/109 |
| 3,696,484 | 10/1972 | Spriggs | 407/41 |
| 4,132,493 | 1/1979 | Hosoi | 407/54 |
| 4,252,480 | 2/1981 | Mizuno | 407/113 |
| 4,566,827 | 1/1986 | Noemueller | 407/113 |
| 4,618,296 | 10/1986 | Allaire | 407/42 |
| 4,682,916 | 7/1987 | Briese | 407/113 |

*Primary Examiner*—Frederick R. Schmidt
*Assistant Examiner*—Blynn Shideler
*Attorney, Agent, or Firm*—David J. Koris

[57] ABSTRACT

Ball nose end mill and method of manufacturing replaceable on-edge high positive single cutting edge triangular inserts each with a pair of dovetail side walls firmly secured by a central screw in a matching dovetail body pocket. Right cylindrical or conical segment convex surface terminating in arcuate cutting edge for generating hemispherical segment is pressed on powdered metal blank with positive rake angle by oblique faced punch and reaction end of uniform straight triangular wall die inherently developing the dovetail side walls.

17 Claims, 3 Drawing Sheets

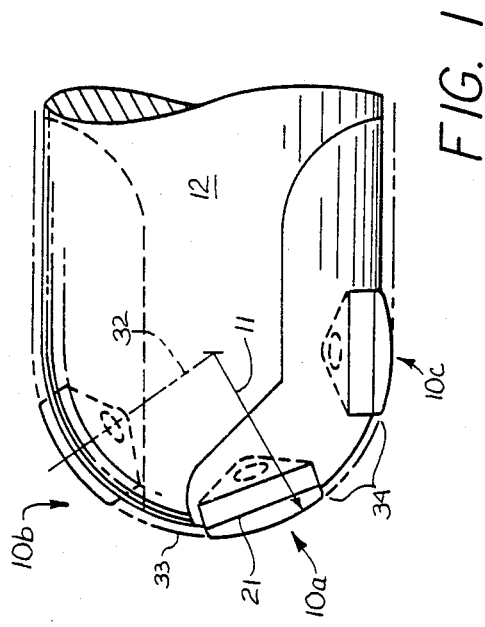
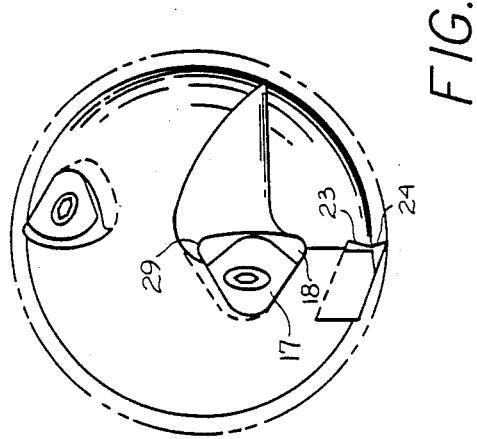
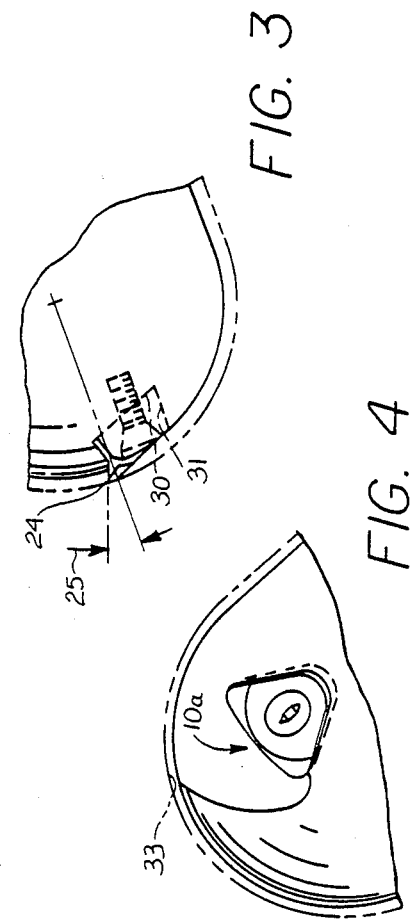
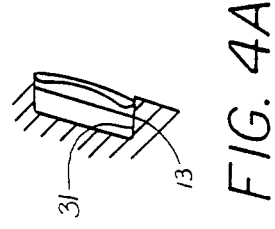
FIG. 1
FIG. 2
FIG. 3
FIG. 4
FIG. 4A

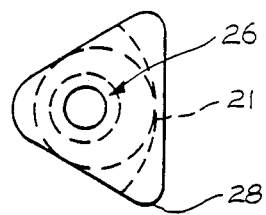
FIG. 5
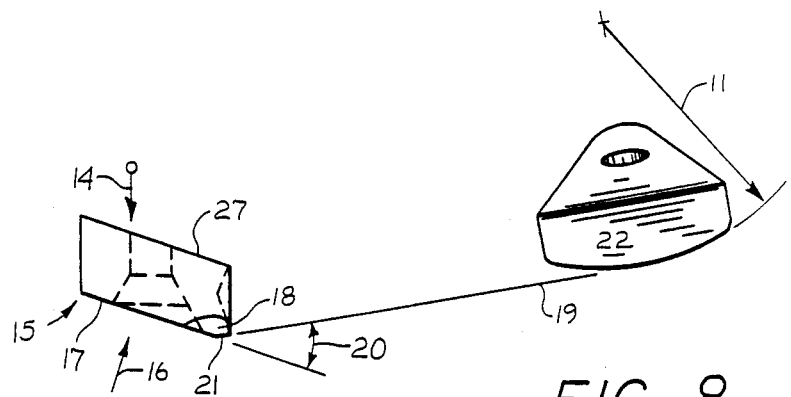
FIG. 6
FIG. 8
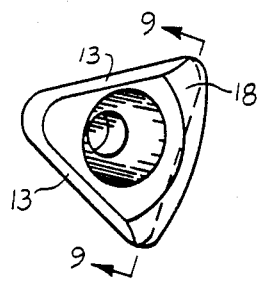
FIG. 7
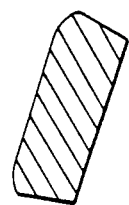
FIG. 9

BALL NOSE END MILL AND METHOD OF MANUFACTURE

BACKGROUND OF THE INVENTION

Ball nose end mills are known in the art in various forms none of which provides high positive rake combined with dovetail pockets for secure insert retention. The closest known prior art involves square or triangular "on-edge" inserts retained by a central screw urging side walls against obtuse angled matching pocket walls. A square insert design of this type is available under the tradename "Ingersoll MAX-I" and a triangular indexable form is disclosed in U.S. Pat. No. 4,618,296. In each case, the holddown screw is subjected to considerable stress under the combination of centrifugal feed and tangential forces particularly since a component of the obtuse reaction support surface of the pocket walls extends in an outward direction.

BRIEF DESCRIPTION OF THE PRESENT INVENTION

A positive rake ball nose end mill with replaceable cutting inserts is directed to provide high positive rake combined with dovetail retention to ensure safe holddown screw stress even with relatively small inserts employed in end mills under one inch diameter. While indexability is not offered, high positive rake and secure retention desirable for machining soft materials such as aluminum or brass at high speeds with corresponding high centrifugal forces comprise important advantages.

Another subject of the invention is a method for manufacturing the inserts which is simple and economical, particularly with respect to minimizing finishing operations. Powdered metal blanks are pressed in a die having straight triangular walls by an oblique faced punch against a parallel oblique faced opposing punch which includes a cylindrical or conical concave margin along one of the triangular side edges which forms a circular cutting edge in the finished insert. A tapered screw hole having an axis parallel to the die walls is formed by a corresponding projection in the pressing operation. A V-groove ground across the cutting edge side of the insert intersects the cylindrical or conical pressed surface to form the finished cutting edge, and further grinding of the seating face comprises the only additional finishing operation. The oblique relationship of the parallel insert faces to the side walls inherently develops the desired dovetail side wall surfaces for the triangular corner of each insert when seated in the end mill body with corresponding oblique seating surface.

BRIEF DESCRIPTION OF THE DRAWINGS

FIG. 1 is a side elevation of an end mill illustrating the ball nose cutting edge of a preferred embodiment;

FIG. 2 is an end view of the FIG. 1 embodiment;

FIG. 3 is a fragmentary projection illustrating a true view of the radially innermost insert taken normal to its central radial plane;

FIG. 4 is a projection of the insert shown in FIG. 3 taken in a direction normal thereto;

FIG. 4a is normal projection of the insert shown in FIG. 4 illustrating the effective dovetail angle of the pocket wall;

FIG. 5 is a plan view of the die shape having straight walls;

FIG. 6 is a side view of an insert blank showing the pressing direction through the die;

FIG. 7 is a projection of the insert of FIG. 6 illustrating the dovetail walls resulting from the oblique faces of the insert;

FIG. 8 is a side view of the insert taken along a line parallel to the axis of the surface forming the cutting edge;

FIG. 9 is a projection showing a sectional view of the insert taken along the line 8—8 of FIG. 7;

DETAILED DESCRIPTION OF THE DRAWINGS

Figure 11:
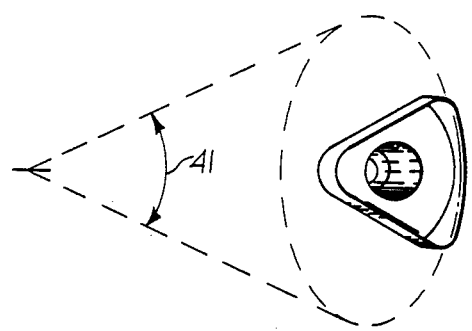
FIG. 11 is a face view of the insert shown in FIG. 10.

With reference to FIGS. 1 and 2, three identical inserts 10a, 10b and 10c each with cutting radius 11, are mounted on the end of ball nose end mill 12. Such inserts are replaceable but not indexable having a generally triangular configuration with only a single arcuate cutting edge and a pair of planar dovetail side walls 13. Such walls result from pressing a powdered metal blank through die shape having straight walls with a cross sectional configuration such as illustrated in FIG. 5, oblique faces as shown in FIG. 6 and a pressing direction indicated at 14 resulting in a finished blank 15 shown in the top and side views of FIGS. 5 and 6 respectively. The projection of FIG. 7 taken in the direction indicated at 16 illustrates how the dovetail walls 13 are developed from pressing through straight walls of the die.

Arcuate cutting radius 11 is formed on lower face 17, as pressed, which becomes the exposed face as mounted, by pressing cylindrical segment 18 with radius 11 onto the leading edge of face 17 having an axis parallel with line 19 forming an angle 20 with face 17. Narrow land 21 at the center cutting edge of the insert broadens at either side in the cylindrical segment surface leaving, however, substantial stock thickness at either extremity for adequate cutting strength. Flat surface 22 of the insert as pressed through the die has a straight V-groove 23 ground across, intersecting cylindrical segment 18 at cutting edge 24 to provide a true positive rake angle 25 when mounted in the end mill as shown in FIG. 3.

Countersunk hole 26 may be formed in the pressing operation so that only the grinding of seating surface 27 and V-groove 23 comprise necessary finishing operations for the insert. The die includes radiused corners 28, the radially innermost of which 29, as mounted in the end mill, intersects the axis of rotation as illustrated in FIG. 2. A planar seatingsurface 30, including dovetail sidewalls 31 is provided in the end mill for each insert angled on a radial plane 32 bisecting the insert corresponding to angle 20 so as to provide true radius 11 in the hemispherical surface 33 to be cut.

In the illustrated embodiment the three inserts are employed to generate a hemispherical surface upon rotation of the end mill with radially innermost insert 10a having a radiused corner 29 intersecting the axis of rotation as pointed out above and oriented with the leading side symmetrically aligned with an axial plane as best shown in FIG. 2. The other two inserts are similarly oriented relative to such axial plane with insert 10c facing the same direction as 10a with a common gullet for chip flow and interval 34 being covered by insert 10b facing the opposite direction upon 180° rotation of the end mill with a separate chip gullet. Optionally other numbers of inserts may be employed with spacing adapted to sweep overlapping hemispherical segment paths.

Figure 10:
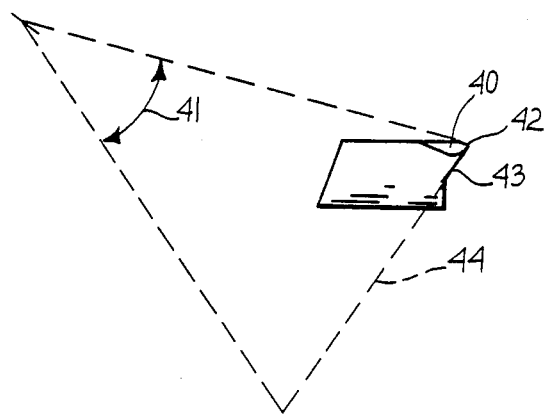
FIG. 10 is a side view of an alternate insert design employing a conical surface segment for the cutting edge in place of the cylindrical surface of the first embodiment.
Figure 12:
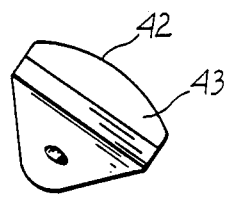
FIG. 12 is a projection taken normal to the base of the cone illustrating the radius of the cutting edge.

With reference to FIGS. 10-12, the alternate insert design is the same as the previously described embodiment with the exception of conical surface 40 formed as a segment of cone 41 oriented so that its cutting edge 42 is intersected by V-groove planar surface 43 extending in the plane of cone base 44 so as to form a true circular arc cutting edge as shown in FIG. 12. This configuration of the insert again provides a high positive rake with more radial clearance than the cylindrical segment surface of the first embodiment.

I claim:

1. Hemispherical ball nose end mill with an axially rotatable body and a plurality of generally triangular replaceable cutting inserts characterized by each insert having a single arcuate cutting edge and a pair of side walls formed as planar surfaces obliquely related to a mounting face for effective dovetail retention, an exposed insert face having a convex surface segment formed thereon terminating in a cutting edge for generating a hemispherical segment, a V-groove formed across the third cutting edge side wall intersecting said corner surface segment at said cutting edge to provide a positive rake cutting angle, and a mounting pocket in said body for each insert including a planar mounting surface and a pair of matching dovetail walls for engaging said insert sidewalls.

2. End mill of claim 1 wherein said convex surface extends across the cutting edge face of said insert forming a narrow land at the center and broadening at either side, each insert being mounted in the end mill body with said convex surface disposed at a clearance angle relative to the generated hemisphere.

3. End mill of claim 1 including a central screw for securing each insert in its mounting pocket.

4. End mill of claim 1 wherein said exposed face is formed with an oblique acute angle relative to the third side wall and its intersecting cutting edge.

5. End mill of claim 4 including a V-groove formed across said third side wall to increase the positive cutting rake angle.

6. End mill of claim 1 wherein said convex surface comprises a right circular cylinder segment.

7. End mill of claim 1 wherein said convex surface comprises a right circular conical segment with the cutting edge extending in a circular arc at the base.

8. End mill of claim 1 wherein each insert is provided with arcuate corners.

9. End mill of claim 8 wherein one of said inserts is mounted on the end mill with one of its arcuate cutting edge corners substantially intersecting the end mill axis.

10. End mill of claim 9 including another insert mounted with its cutting edge extending to a diametric perimeter of the hemispherical surface during axial rotation of said end mill.

11. End mill of claim 10 including a third insert mounted with its cutting edge positioned to generate a hemispherical segment overlapping the adjacent edges of segments generated by said first two inserts.

12. End mill of claim 10 wherein the cutting edges of both inserts extend substantially in the same axial plane.

13. End mill of claim 10 wherein the cutting edges of both inserts extend substantially in the same axial plane and face in the same direction.

14. End mill of claim 10 including at least one insert having its cutting edge mounted in an arc sweeping a portion of said hemispherical surface intermediate the portion swept by the cutting edges of said first two inserts.

15. End mill of claim 14 wherein said intermediate insert is positioned with its cutting edge extending in substantially the same axial plane facing the other way on the opposite side of said end mill body.

16. End mill of claim 15 wherein a common gullet is provided for chip flow from said first two inserts ad a separate independent gullet is provided for chip flow from said third insert.

17. End mill of claim 14 wherein all inserts are mounted with their respective cutting edges extending in a position sweeping a true segment of a hemispherical surface.

* * * * *